US012678967B2

(12) United States Patent
Inagaki

(10) Patent No.: US 12,678,967 B2
(45) Date of Patent: Jul. 14, 2026

(54) WORK ASSISTANCE DEVICE AND WORK ASSISTANCE METHOD

(71) Applicant: Fanuc Corporation, Yamanashi (JP)

(72) Inventor: Satoshi Inagaki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/703,538

(22) PCT Filed: Oct. 29, 2021

(86) PCT No.: PCT/JP2021/040136
§ 371 (c)(1),
(2) Date: Apr. 22, 2024

(87) PCT Pub. No.: WO2023/073959
PCT Pub. Date: May 4, 2023

(65) Prior Publication Data
US 2024/0416524 A1      Dec. 19, 2024

(51) Int. Cl.
B25J 9/16              (2006.01)
(52) U.S. Cl.
CPC ........... B25J 9/1697 (2013.01); B25J 9/1671 (2013.01)
(58) Field of Classification Search
CPC .............................. B25J 9/1697; B25J 9/1671
See application file for complete search history.

(56) References Cited

U.S. PATENT DOCUMENTS

2002/0016647 A1      2/2002   Bourne et al.
2002/0038163 A1*    3/2002   Hazama ............... G06V 10/426
                                              700/165
(Continued)

FOREIGN PATENT DOCUMENTS

CN          104552298 A         4/2015
CN          106066633 A        11/2016
(Continued)

OTHER PUBLICATIONS

International Search Report (PCT/ISA/210) with English translation and Written Opinion (PCT/ISA/237) mailed on Jan. 11, 2022, by the Japanese Patent Office as the International Searching Authority for International Application No. PCT/JP2021/040136.
(Continued)

*Primary Examiner* — Mohamad O El Sayah
(74) *Attorney, Agent, or Firm* — BUCHANAN INGERSOLL & ROONEY PC

(57)              ABSTRACT

Provided are a work assistance device and a work assistance method that automatically create a projected drawing suitable for designating a work region on a target, regardless of the skill level of a worker. The work assistance device has: a projected drawing creation function for projecting a work target, which has a work target surface that includes a work target region on which work is performed by a robot, in a direction perpendicular to the work target surface, thereby creating in a virtual space a projected drawing parallel to the work target surface; a work region designation function for designating a work target region in the projected drawing; and a work region conversion function for converting the location of the work target region designated in the projected drawing to a location in the virtual space.

5 Claims, 7 Drawing Sheets

(56) References Cited

U.S. PATENT DOCUMENTS

| | | | |
|---|---|---|---|
| 2005/0256606 A1* | 11/2005 | Irri .................. | G05B 19/41825 |
| | | | 700/213 |
| 2006/0181236 A1* | 8/2006 | Brogardh ............ | G05B 19/425 |
| | | | 318/568.1 |
| 2015/0112482 A1 | 4/2015 | Kuwahara | |
| 2018/0218544 A1 | 8/2018 | Coleman et al. | |
| 2020/0306980 A1 | 10/2020 | Choi et al. | |
| 2020/0311956 A1* | 10/2020 | Choi ................... | G06V 10/454 |
| 2021/0350632 A1* | 11/2021 | Ghassaei ................ | G06T 13/20 |
| 2024/0208047 A1* | 6/2024 | Itou ..................... | G06V 10/987 |

FOREIGN PATENT DOCUMENTS

| | | | |
|---|---|---|---|
| JP | H0588732 | A | 4/1993 |
| JP | 2004082216 | A | 3/2004 |
| JP | 2007030042 | A | 2/2007 |
| WO | 9615481 | A2 | 5/1996 |

OTHER PUBLICATIONS

Rudek et al., "Multiple 3D Objects Identification from Images Based on Bounding Box Reconstruction", ABCM Symposium Series in Mechatronics, 2010, vol. 4, pp. 38-43.
Valencia et al., "A 3D Vision Based Approach for Optimal Grasp of Vacuum Grippers", 2017 IEEE International Workshop of Electronics, Control, Measurement, Signals and their Application to Mechatronics (ECMSM), 2017, pp. 1-6.

* cited by examiner

Fig. 3

WORK ASSISTANCE DEVICE AND WORK ASSISTANCE METHOD

CROSS REFERENCE TO RELATED APPLICATIONS

This is the U.S. National Phase application of PCT/JP2021/040136, filed Oct. 29, 2021, the disclosure of this application being incorporated herein by reference in its entirety for all purposes.

FIELD OF THE INVENTION

The present invention relates to a device and a method for assisting an operation to be performed by a robot.

BACKGROUND OF THE INVENTION

There is a well-known technique in which various motions using a robot are previously simulated using a simulation device. For example, in a bending process in which a robot grips a workpiece and supplies it to a bending machine, a simulation technique is well known in which a developed view of the workpiece is displayed so that an operator can determine the bending order of the workpiece (e.g., see Patent Literature 1).

Further, there is a well-known technique in which, by obtaining two-dimensional projection data using three-dimensional CAD data of an object, NC data of only necessary portions of the object can be selectively created (e.g., see Patent Literature 2).

PATENT LITERATURE

[PTL 1] JP 2004-082216 A
[PTL 2] JP 1993 (H05)-088732 A

SUMMARY OF THE INVENTION

When an operator uses a terminal, etc., to specify a part of an object to be operated by a robot, such as a bending line on a workpiece, the difficulty of the operation may vary significantly, depending on how the object is displayed. For example, it is easier to specify the position, etc., of a workpiece, which is a three-dimensional object, when it is represented as a two-dimensional image projected in a certain direction, but it is difficult to determine the optimal projection direction, regardless of the skill level of the operator.

One aspect of the present disclosure is a work assistance device comprising: a projection view generating function for projecting an object, which has a work target surface including a work target region on which work is performed by a robot, in a direction perpendicular to the work target surface, and generating a projection view parallel to the work target surface in a virtual space; a work region designating function for designating the work target region on the projection view; and a work region converting function for converting a position of the work target region designated on the projection view to a position in the virtual space.

Another aspect of the present disclosure is a work assistance method comprising the steps of: projecting an object, which has a work target surface including a work target region on which work is performed by a robot, in a direction perpendicular to the work target surface, and generating a projection view parallel to the work target surface in a virtual space; designating the work target region on the projection view; and converting a position of the work target region designated on the projection view to a position in the virtual space.

According to the present disclosure, since a projection view suitable for designating the work region on the workpiece can be automatically generated, regardless of the skill level of the operator, the burden on the operator and the work time can be significantly reduced.

BRIEF DESCRIPTION OF DRAWINGS

FIG. 3 is a view explaining a method for designating a bending line on the object of FIG. 2.

DETAILED DESCRIPTION OF EMBODIMENTS OF THE INVENTION

Figure 1:
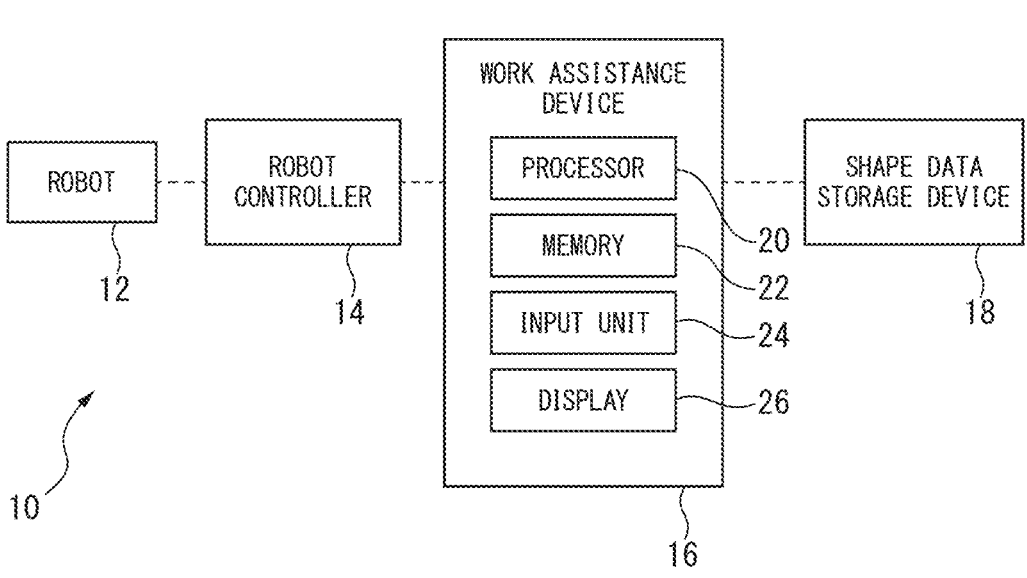
FIG. 1 is a block diagram of a system including a work assistance device according to an embodiment.

FIG. 1 is a schematic block diagram of a system including a robot and a work assistance device according to a preferred embodiment. A system 10 includes at least one robot 12, a robot control device (robot controller) 14 configured to control the robot 12, a work assistance device 16 configured to assist a work to be performed by the robot 12 by a process as described below, and a shape data storage device 18 configured to store data (e.g., CAD data) of a three-dimensional (3D) shape of a work object (workpiece) of the robot 12. These devices are communicably connected to each other by wire or wirelessly.

The robot 12 is, for example, an industrial articulated robot, and is configured to perform various operations such as bending process and a pick-up motion, as described later, based on a command transmitted from the robot controller 14. The robot controller 14 includes a processor and a memory, etc., and is configured to control the robot 12, based on a prepared robot program and/or a simulation result of the work assistance device 16, etc.

The work assistance device 16 is, for example, a computing machine such as a personal computer (PC) which is independent of the robot controller 14, and includes a processor 20 for executing a process as described later, a memory 22, an input unit 24 such as a keyboard or a touch panel, and a display 26. However, the controller 14 and the work assistance device 16 can also be substantially integrated as one device. The shape data storage device 18 is, for example, a CAD device, and can store data such as 3D shape data of the workpiece. Further, the work assistance device 16 and the shape data storage device 18 can be substantially integrated as one device.

The work assistance device 16 has: a projection view generating function for projecting a work target surface corresponding to a region of the workpiece on which work is performed by the robot 12, in a direction perpendicular to the work target surface, and generating a projection view in a virtual space, by using 3D data of the workpiece stored in the CAD device 18, etc.; a work region designating function for designating the region, on which the robot 12 performs the work, on the generated projection view. In the embodiment, the projection view generating function and the work region converting function are performed by the processor of the work assistance device 16, and the work region designating function is performed by the processor and the input unit of the work assistance device 16. A specific example of processing in the work assistance device 16 will be described below.

First Example

Figure 2:
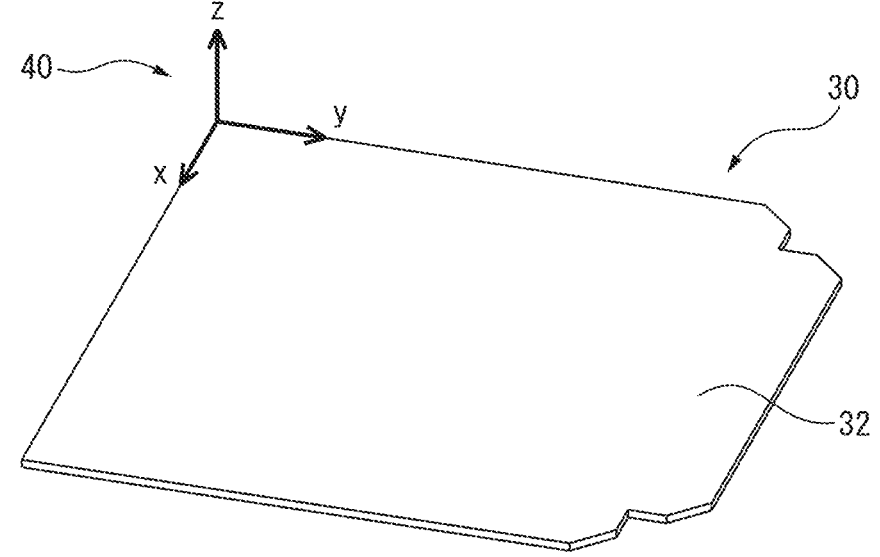
FIG. 2 is a view exemplifying an object determined in a virtual space, on which a bending process is performed.
Figure 3:
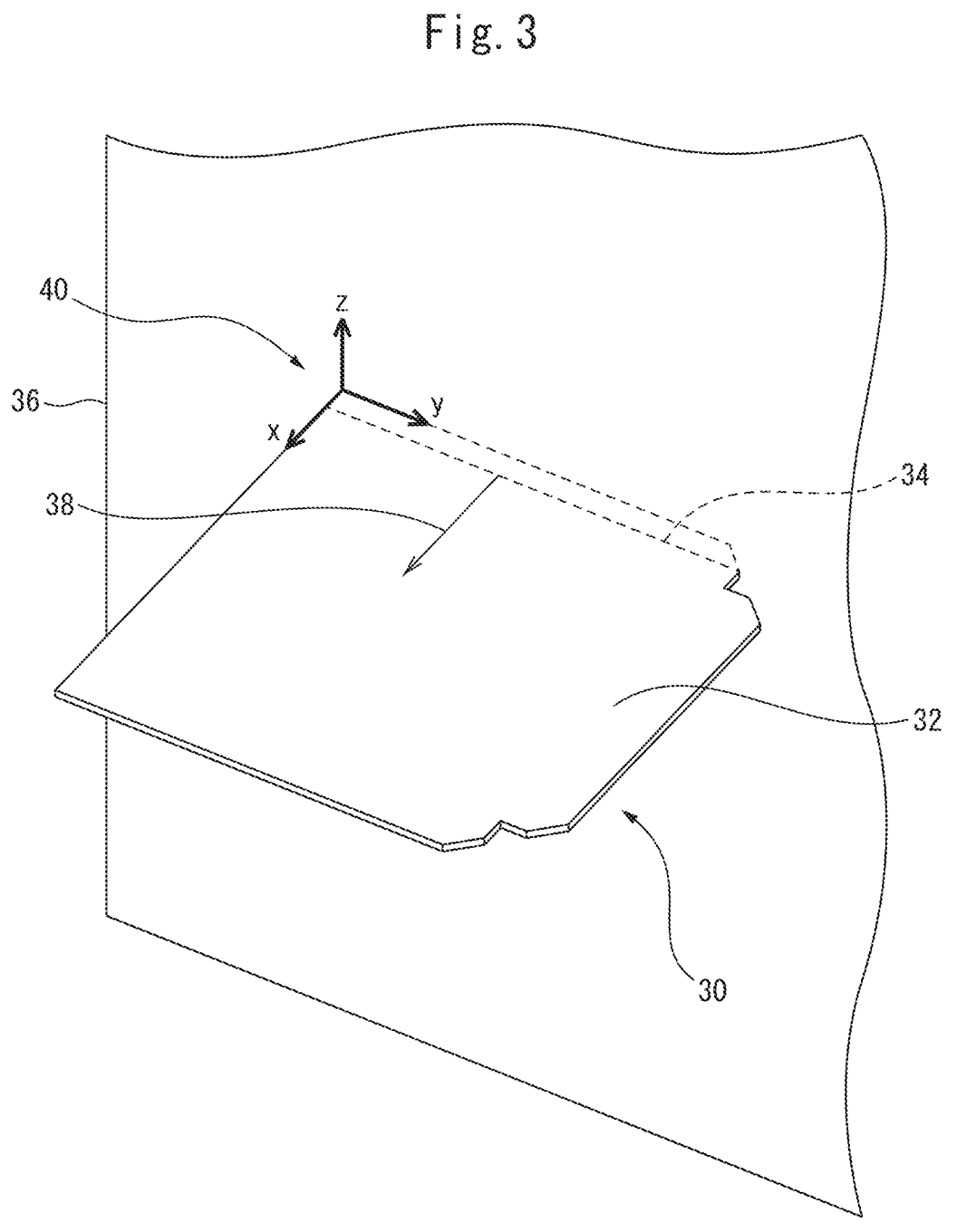

In this example, the device and method for simulating a bending process is explained as an example of a process of the object using the robot. FIGS. 2 and 3 show a virtual space displayed on the display 26, etc., of the work assistance device 16. Here, a simulation is performed in which the robot 12 grips a workpiece 30, which is a flat sheet metal, and a process (in this case, a bending process) of the workpiece 30 is performed along a processing line (e.g., a bending line) 34 designated on a work target surface 32 of the workpiece.

One method for designating the bending line 34 is to set a virtual plane 36 in the virtual space as shown in FIG. 3, and determine an intersection line between the workpiece 30 and the plane 36 as the bending line 34. Normally, the sheet metal is bent in the thinnest direction of the sheet metal, and thus it is preferable that a normal line direction 38 the plane 36 be designated in a direction perpendicular to the thinnest direction of the sheet metal.

In this regard, when the direction of each axis of a robot coordinate system 40 in the virtual 3D space is parallel to each side of the workpiece 30 as shown in FIGS. 2 and 3, it is sufficient to perform the designation so that the normal direction 38 of the plane 36 coincides with one axis direction (here, the x-direction) of the coordinate system 40. Therefore, the operator can relatively easily designate the bending line 34 via the input unit 24, etc., of the work assistance device 16.

Figure 4:
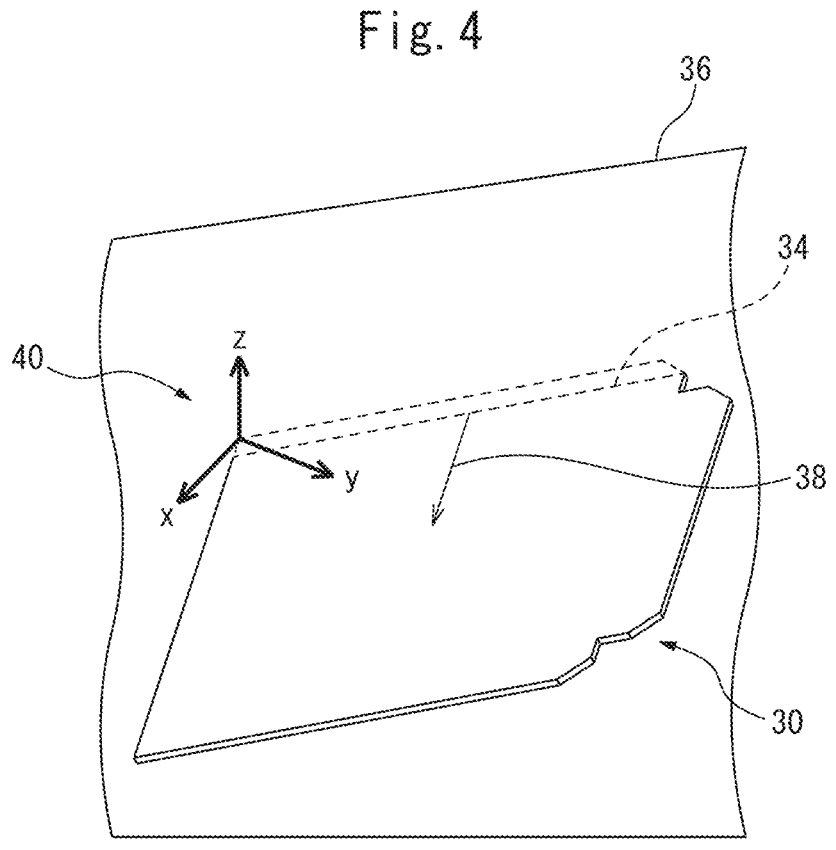
FIG. 4 is a view showing an example in which the orientation of the object is different from FIG. 3.

However, as shown in FIG. 4, when the direction of each axis of the coordinate system 40 is not parallel to each side of the workpiece 30, the normal direction 38 of the plane 36 does not coincide with any axis direction of the coordinate system 40. Therefore, the operator must make appropriate changes (rotational movement, etc.) with respect to the normal direction 38 before designating the bend line 34. Such operations can be difficult and time consuming, depending on the skill level of the operator.

Figure 5:
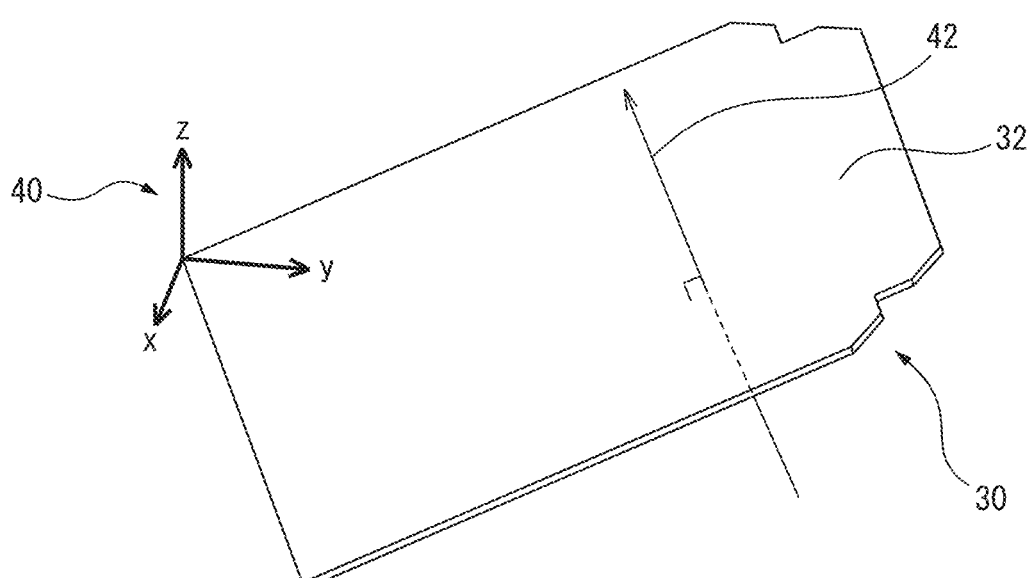
FIG. 5 is a view explaining a projection direction of a work target surface of the object of the bending process.
Figure 6:
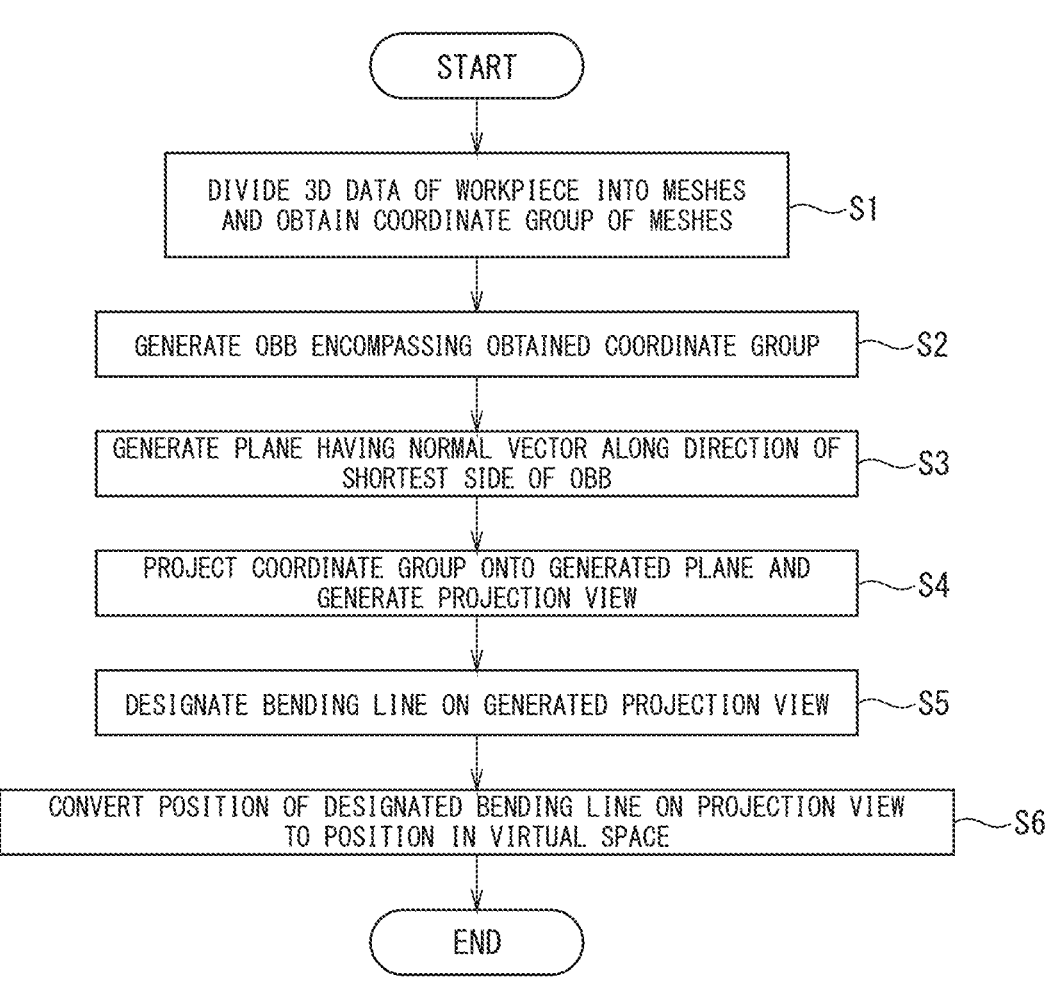
FIG. 6 is a flowchart showing an example of processes of the work assistance device.

Therefore, in the first example, as shown in FIG. 5, the operator designates a direction 42 perpendicular to the work target surface 32 of the workpiece 30 (in this example, the thinnest direction of the workpiece 30), or determines the direction 42 by a process described later, and a projection view in which the work target surface 32 is projected onto a plane having a normal vector 42 along the direction 42 (i.e., a plane parallel to the work target surface 32) is generated, and the bending line is designated on the generate projection view. Hereinafter, these processes will be described with reference to a flowchart of FIG. 6.

First, in step S1, the 3D data of the workpiece 30 stored in the CAD device 18 is divided into an appropriate number of meshes, and a coordinate group of representative points such as vertices of the meshes is obtained.

Figure 7:
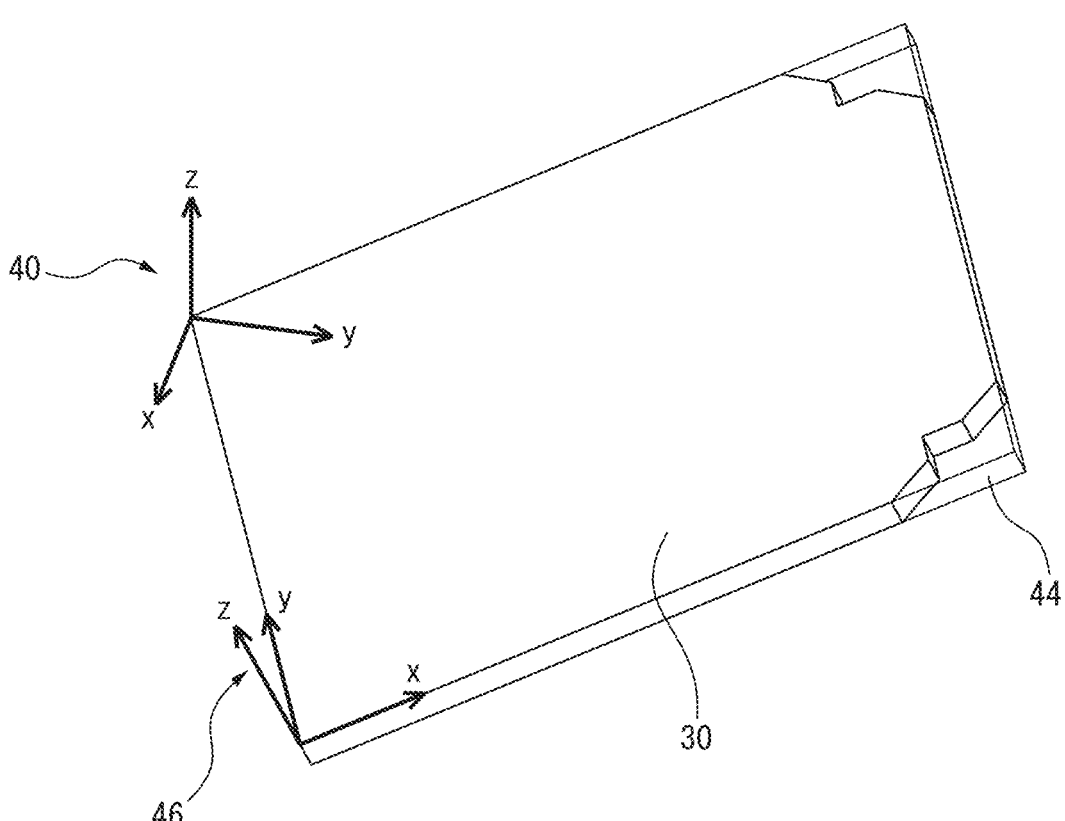
FIG. 7 is a view showing an example of an oriented bounding box encompassing the work object.

Next, in step S2, as shown in FIG. 7, an oriented bounding box (hereinafter also referred to as OBB) 44 that encompasses the workpiece 30, more specifically, the obtained coordinate group of the vertices, is generated in the virtual space, based on the robot coordinate system 40. The OBB 44 is a rectangular parallelepiped with directionality, and since the OBB 44 itself and the method for generating it are well known, a detailed explanation thereof will be omitted. It should be noted that the direction of each side of the OBB 44 is represented by an OBB coordinate system 46 set in the OBB 44, but in FIG. 7, the dimension in the thickness direction of the workpiece 30 (z-direction of the coordinate system 46) is enlarged for clarity.

Next, in step S3, a virtual plane 48 (see FIG. 9 described later) is generated having a normal vector corresponding to a direction vector of the shortest side of the OBB 44 (in the illustrated example, the z-direction of the OBB coordinate system 46). Here, the z-direction of the OBB 44 is the thinnest direction of the workpiece 30, and is also the direction perpendicular to the work target surface 32.

Figures 8, 9:
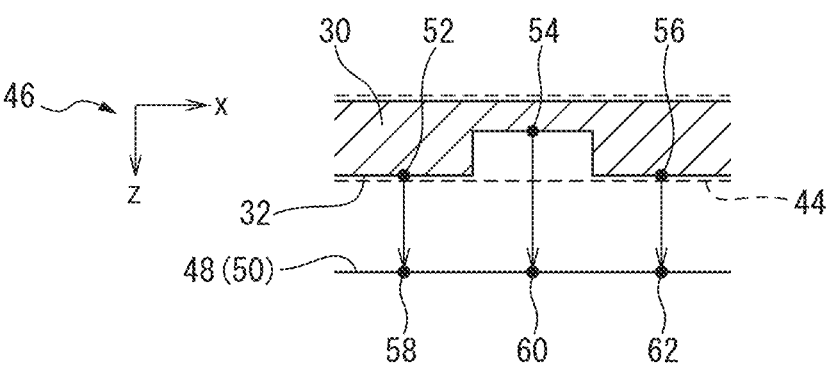
FIG. 8 is a view showing a projection view of the work target surface of the object of the bending process.
FIG. 9 is a view exemplifying the positional relationship between the work target and the projection view.

Next, in step S4, the coordinate group obtained in step S1 is projected onto the generated plane 48 in the normal vector direction (z-direction of the OBB coordinate system 46), so that a projection view 50 as shown in FIG. 8 is generated.

Next, in step S5, the operator, etc., inputs and designates the position of the bending line 34 on the projection view 50 displayed on the display 26 via the input unit 24, etc., and the display 26 displays the designated bending line 34. Finally, in step S6, the position of the bending line 34 designated on the projection view 50 is converted to a position in the virtual space, based on the robot coordinate system 40, thereby completing the setting of the bending line. In this way, 3D data of the bending line, which can be used when the robot 12 performs the bending process, is obtained.

Among steps S1 to S6, the steps other than S5 can be automatically executed by the work assistance device 16, and step S5 is performed, based on the input by the operator. However, by previously setting conditions, etc., of the bending line, step S5 can also be automatically executed by the processor 20, etc., of the work assistance device 16.

In the first example, by generating the projection view 50 in which the 3D model of the workpiece 30 is projected in its thinnest direction, the operator can specify the position of the bending line 34 on the projection view 50. Since the projection view 50 accurately reflects the shape of the work target surface 32, even when the direction of each side of the workpiece 30 does not match the direction of each axis of the robot coordinate system 40, the operator can easily and accurately designate the bending line without having to perform troublesome operations such as rotating the 3D model, etc.

In addition, when the OBB 44 is used, the direction vector of the shortest side of the OBB 44 (here, the z-direction) coincides with the thinnest direction of the workpiece 30, so it is easier to calculate the projection view 50 suitable for designating the bending line 34.

FIG. 9 is a schematic view showing the positional relationship between the work target surface 32 of the workpiece 30 and the flat plane 48 on which the projection view 50 is generated. Even when the thickness of the workpiece 30 is not uniform as shown in FIG. 9, by projecting the vertices of each mesh as indicated by points 52, 54 and 56 onto the plane 48 having the normal vector along the direction of the shortest side of the OBB 44 (the z-direction of the coordinate system 46) so as to determine points 58, 60 and 62 on the projection view 50, a projection view suitable for designating the bending line can be obtained.

Typically, the bending line is designated to the thinnest portion of the workpiece, and thus, in the example of FIG. 9, the bending line may be designated to the point 60, but not to the points 58 and 62. Therefore, when the thickness of the workpiece is not uniform, considering the fact that the distance between the work target surface and the projection view differs, depending on the location, each point on the projection view can be visually identified by changing the color or shape of a mark, based on the distance between each point on the workpiece 30 and each corresponding point on the plane 48 (e.g., the distance between the points 54 and 60). In this way, for example, the point 60 on the thin portion of the workpiece 30 will be displayed in a different color and/or shape from the points 58 and 62 on the thick portion, so the operator can clearly understand which portion on the projection view the bending line should be designated.

As described above, in the first example, the work assistance device 16 functions as a simulation device configured to execute the simulation of the bending process and transmit the simulation results to the robot controller 14.

Second Example

Figure 10:
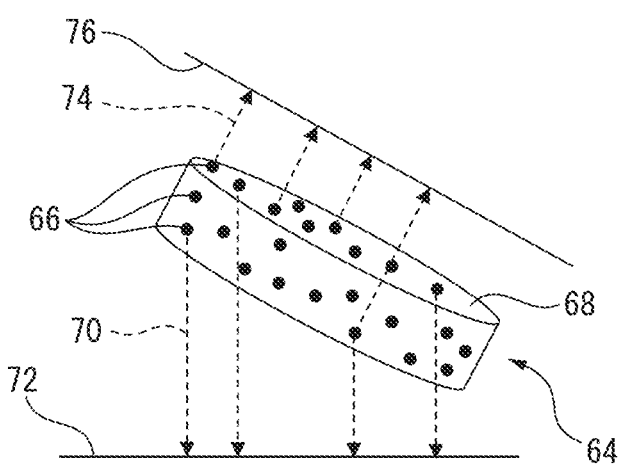
FIG. 10 is a view explaining a projection direction of a work target surface of an object of a picking operation.

In the second example, the work assistance device 16 functions as a device which assist a picking motion of articles by the robot 12. In this case, as shown in FIG. 10, a plurality of workpieces 64 each having an elliptical work target surface 68 are randomly stacked, and it is assumed that the workpieces 64 are sequentially picked up by the robot 12, based on a detection result of the workpieces obtained by the vision sensor (e.g., an image captured by a camera).

In the second example, as in the first embodiment, the workpiece 64 is divided into an appropriate number of meshes, and a point group 66 representing representative points such as the vertices of the meshes is obtained. Next, the point group 66 is projected onto a virtual plane to generate a projection view. In this regard, since the stacked workpieces 64 are tilted, when the point group 66 is projected onto a virtual plane 72 perpendicular to the vertical direction 70, for example, the distance and positional relationship between each point may not be accurately reflected in the obtained projection view.

Figure 11:
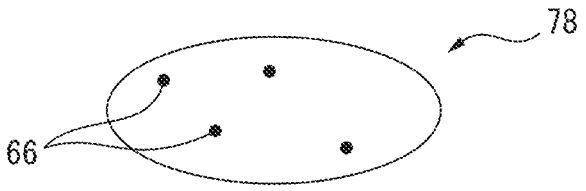
FIG. 11 is a view showing a projection view of the work target surface of FIG. 10.

Therefore, in the second example, it is preferable that the point group 66 be projected onto a virtual flat plane 76 in a direction of a normal vector 74 of a work target surface 68 (here, corresponding to a surface held by suction, etc., with the hand of the robot 12) so as to obtain a projection view, wherein the virtual plane 76 is perpendicular to the normal vector 74 (i.e., parallel to the work target surface 68). In this way, as shown in FIG. 11, a projection view 78 including a point group having the same positional relationship as the point group on the work surface 68 is obtained, so that the operator can accurately designate which portion on the work target surface 68 should be determined as the target region of the work such as suction. It should be noted that instead of being designated by the operator, for example, the position of the center of gravity of the work target surface 68 may be automatically calculated, based on the position of the point group 66 in the projection view 78, and the calculated position of the center of gravity may be set as the work target region. Using the position of the work target region obtained in this way, it is possible to appropriately determine the portion of the work target surface 68 to be held by the robot 12.

Also in the second embodiment, when the 3D data of the workpiece 64 is previously stored in the CAD device 18, etc., the work assistance device 16 may generate an OBB as in the first embodiment, based on the 3D data and the camera image of the workpiece. In that case, by projecting the workpiece 64 and the point group 66 in the direction (e.g., the z-direction) perpendicular to the work target surface 68 (e.g., the x-y plane) of the workpiece 64 on the OBB, and by generating a projection view parallel to the work target surface 68, the same effects as in the first embodiment can be obtained.

According to the present disclosure, by virtually generating the projection view parallel to the work target surface, the settings necessary for various works performed by the robot, such as designating the bending line and the gripping position of the workpiece, can be easily and accurately performed.

REFERENCE SIGNS LIST

10 system
12 robot
14 robot controller
16 work assistance device
18 shape data storage device
20 processor
22 memory
24 input unit
26 display
30, 64 workpiece
32, 68 work target surface
34 bending line
36, 48, 72, 76 virtual plane
38, 42, 74 normal vector
40 robot coordinate system
44 oriented bounding box
46 OBB coordinate system
50, 78 projection view

The invention claimed is:

1. A work assistance device comprising:
   a projection view generating function for projecting an object, which has a work target surface including a work target region on which work is performed by a robot, in a direction perpendicular to the work target surface, and generating a projection view parallel to the work target surface in a virtual space;
   a work region designating function for designating the work target region on the projection view; and
   a work region converting function for converting a position of the work target region designated on the projection view to a position in the virtual space,
   wherein the work assistance device generates an oriented bounding box encompassing the object in the virtual space based on a robot coordinate system, and the projection view is generated by generating a virtual plane having a normal vector extending in a direction along a shortest side of the oriented bounding box and by projecting a coordinate group of representative points of the object onto the generated virtual plane in a direction of the normal vector, and wherein the robot is controlled to perform a work in accordance with the designated work target on the generated projection view.

2. The work assistance device according to claim 1, wherein the work is a bending process of the object, and the work target region is a bending line with respect to the bending process.

3. The work assistance device according to claim 2, wherein the work target region on the projection view is displayed so that the work target region can be visually identified, based on a distance between the work target region on the projection view and the corresponding work target region on the object.

4. The work assistance device according to claim 1, wherein the work is a picking motion of the object, and the work target region is a part of the object to be held by the robot.

5. A work assistance method comprising the steps of:

projecting an object, which has a work target surface including a work target region on which work is performed by a robot, in a direction perpendicular to the work target surface, and generating a projection view parallel to the work target surface in a virtual space;

designating the work target region on the projection view;

converting a position of the work target region designated on the projection view to a position in the virtual space;

generating an oriented bounding box encompassing the object in the virtual space based on a robot coordinate system;

generating a virtual plane having a normal vector extending in a direction along a shortest side of the oriented bounding box;

projecting a coordinate group of representative points of the object onto the generated virtual plane in a direction of the normal vector; and controlling the robot to perform a work in accordance with the designated work target on the generated projection view.

\* \* \* \* \*